US 11,444,356 B2

(12) United States Patent
Shiotani et al.

(10) Patent No.: US 11,444,356 B2
(45) Date of Patent: Sep. 13, 2022

(54) SEALING PLATE

(71) Applicant: DAIWA CAN COMPANY, Chiyoda-ku (JP)

(72) Inventors: Masahiro Shiotani, Sagamihara (JP); Taichi Horie, Sagamihara (JP); Yusuke Yamawaki, Sagamihara (JP)

(73) Assignee: DAIWA CAN COMPANY, Chiyoda-ku (JP)

( * ) Notice: Subject to any disclaimer, the term of this patent is extended or adjusted under 35 U.S.C. 154(b) by 299 days.

(21) Appl. No.: 16/641,039

(22) PCT Filed: Aug. 20, 2018

(86) PCT No.: PCT/JP2018/030623
§ 371 (c)(1),
(2) Date: Feb. 21, 2020

(87) PCT Pub. No.: WO2019/039422
PCT Pub. Date: Feb. 28, 2019

(65) Prior Publication Data
US 2021/0175577 A1   Jun. 10, 2021

(30) Foreign Application Priority Data
Aug. 22, 2017   (JP) .............................. JP2017-159764

(51) Int. Cl.
*H01M 50/342* (2021.01)
*H01M 50/147* (2021.01)
*H01M 10/0525* (2010.01)

(52) U.S. Cl.
CPC ... *H01M 50/3425* (2021.01); *H01M 10/0525* (2013.01); *H01M 50/147* (2021.01); *H01M 2220/20* (2013.01)

(58) Field of Classification Search
CPC .......... H01M 50/3425; H01M 50/147; H01M 10/0525; H01M 2220/20
See application file for complete search history.

(56) References Cited

U.S. PATENT DOCUMENTS

2001/0027807 A1   10/2001   Morishita et al.
2005/0069760 A1    3/2005   Somatomo
(Continued)

FOREIGN PATENT DOCUMENTS

CN   1313642 A   9/2001
CN   1591929 A   3/2005
(Continued)

OTHER PUBLICATIONS

EPO machine generated English translation of JP 2002-367583A (Year: 2002).*
(Continued)

*Primary Examiner* — Christopher P Domone
*Assistant Examiner* — Kimberly Wyluda
(74) *Attorney, Agent, or Firm* — Oblon, McClelland, Maier & Neustadt, L.L.P.

(57) ABSTRACT

A sealing plate including an explosion-proof valve whose opening pressure can be set easily, and whose groove will not be not ruptured by a repeated stress before reaching an opening pressure. The explosion-proof valve including a thin plate portion thinner than a plate; a valve portion formed by partially projecting the thin plate portion in a thickness direction to enhance a bending rigidity; and a groove drawn as a boundary between the valve portion and the thin plate portion to serves as a score line. A rupturable portion that is ruptured after the groove is ruptured is formed between a straight line and a folding line. The valve portion is bent
(Continued)

along the folding line to open the explosion-proof valve when the rupturable portion is ruptured after the groove is ruptured.

9 Claims, 8 Drawing Sheets

(56) References Cited

U.S. PATENT DOCUMENTS

| | | | |
|---|---|---|---|
| 2011/0212350 A1 | 9/2011 | Sato et al. | |
| 2011/0305946 A1 | 12/2011 | Moride | |
| 2012/0088128 A1 | 4/2012 | Matsuura et al. | |
| 2014/0023890 A1* | 1/2014 | Okutani | H01M 50/60 72/352 |
| 2020/0243822 A1* | 7/2020 | Sodeyama | B60L 50/64 |

FOREIGN PATENT DOCUMENTS

| | | |
|---|---|---|
| CN | 1612375 A | 5/2005 |
| CN | 102170011 A | 8/2011 |
| JP | 11-273640 A | 10/1999 |
| JP | 2001-256944 A | 9/2001 |
| JP | 2001-325934 A | 11/2001 |
| JP | 2002-367583 A | 12/2002 |
| JP | 2003-187774 A | 7/2003 |
| JP | 2005-71836 A | 3/2005 |
| JP | 2005-108584 A | 4/2005 |
| JP | 2006-244722 A | 9/2006 |
| JP | 2010-165590 A | 7/2010 |
| JP | WO2010/100731 A1 | 9/2010 |
| JP | 2010-282850 A | 12/2010 |
| JP | 2011-181214 A | 9/2011 |
| JP | 2012-59496 A | 3/2012 |
| JP | 4955865 B2 | 6/2012 |
| JP | 2015-69715 A | 4/2015 |
| JP | 2015-69716 A | 4/2015 |
| JP | 2015-173126 A | 10/2015 |
| JP | 2016-157570 A | 9/2016 |
| JP | 6088566 B2 | 3/2017 |

OTHER PUBLICATIONS

International Search Report dated Nov. 13, 2018 in PCT/JP2018/030623 filed on Aug. 20, 2018, citing references AA and AO-AR therein, 1 page.

* cited by examiner

SEALING PLATE

TECHNICAL FIELD

The present invention relates to a sealing plate for sealing a container of a sealed battery, and more specifically, to a sealing plate having an explosion-proof valve that releases gas in the container to the outside when an internal pressure of the container exceeds a predetermined level.

BACKGROUND ART

A sealed container of a non-aqueous electrolyte secondary battery (e.g. a lithium ion secondary battery) having an explosion-proof valve is known in the art. The sealed container of this kind contains a non-aqueous electrolyte. Therefore, if the battery is charged and discharged repeatedly, or if a short circuit or an overcharge occurs, the non-aqueous electrolyte may be degraded to generate gas, and an internal pressure of the container may be increased by the generated gas. For this reason, the container is provided with a safety valve (an explosion-proof valve) that is ruptured when the internal pressure of the container is raised to a predetermined level to release the internal pressure (c.f. Patent Document 1).

According to the teachings of the Patent Document 1, a thin safety valve is formed in a sealing plate closing the container, and the safety valve is ruptured to release the internal gas when internal pressure of the container is raised to a predetermined level. The safety valve includes a domed portion, and a score line is formed in a central portion of the safety valve or in the vicinity thereof.

There is also known a sealing plate having a depressed section formed within a predetermined area of a metal plate closing an opening of a container, and a groove and a bulging portion formed on a bottom surface of the depressed section (c.f., Patent Document 2). The groove extends from a center of the depressed section to the vicinity of a boundary of the depressed section to substantially enclose two adjacent sections, and the groove is formed of the bottom surface at least partially. The bulging portion is formed in such a manner that the two adjacent sections protrude individually toward a top surface of the metal plate.

There is also known a sealing plate having a plate member serving as an outer shell of a battery container, and a safety valve formed integrally with the plate member (c.f., Patent Document 3). The safety valve of this kind comprises an outer depressed section, an inner depressed section, an outer peripheral curved section, two hatch sections, a ligament section, a first peripheral groove, a first transverse groove, and a second peripheral groove. The outer depressed section is depressed from a top surface of the plate member, and the inner depressed section is depressed from a bottom surface of the plate member at which the outer depressed section is formed. The outer peripheral curved section is formed integrally with the plate member between the outer depressed section and the inner depressed section. A width of the outer peripheral curved section is constant, and the outer peripheral curved section extends along an inner circumference of the outer depressed section while protruding toward the outer depressed section. The hatch sections are formed radially inner side of the outer peripheral curved section to protrude toward the outer depressed section, and the hatch sections are connected to the outer peripheral curved section through the ligament section. The first peripheral groove is formed between the outer peripheral curved section and the hatch sections while being depressed from the outer depressed section side. The first transverse groove is formed between the hatch sections while being depressed from the outer depressed section side, and connected to the first peripheral groove. The second peripheral groove is formed in the first peripheral groove except for at least the ligament section.

PRIOR ART DOCUMENT

Patent Literature

Patent Document 1: JP 2001-325934 A.
Patent Document 2: JP 4955865 B2.
Patent Document 3: JP 6088566 B2.

SUMMARY OF INVENTION

Technical Problem to be Solved by the Invention

In each of the safety valves and the sealing plates described in Patent Documents 1 to 3, a working pressure (or an opening pressure) of the safety valve is governed by a thickness of the valve or a residual thickness of the groove formed around the valve.

By the way, in recent years, a large capacity and a high output lithium-ion secondary battery which can be charged repeatedly is required to serve as a power source of a hybrid vehicle. Such high-performance secondary battery requires a safe and rigid container.

For example, a secondary battery for an electric vehicle is charged frequently and repeatedly, and discharges electricity frequently and repeatedly. Consequently, generation of gas, condensation, thermal expansion etc. are caused thereby increasing a pressure difference and a change in content. In the conventional container of the secondary battery, therefore, a groove serving as a part of a safety valve (an explosion-proof valve) is subjected to a stress change repeatedly. For this reason, as a result of using the secondary battery, the groove of the safety valve may be raptured or broken even if an internal pressure has not yet been raised to an opening pressure.

In particular, if an opening area of the safety valve is enlarged with an increase in a capacity of the secondary battery, a length of the groove has to be elongated, and the groove may be raptured easily. If a residual thickness of the groove is increased to avoid such disadvantage, the groove may not be ruptured even if the internal pressure is raised to the opening pressure, and this makes difficult to set the opening pressure.

The present invention has been conceived noting the foregoing technical problems, and it is therefore an object of the present invention to provide a sealing plate having an explosion-proof valve whose opening pressure can be set easily, and whose groove will not be not ruptured by a repeated stress before reaching an opening pressure.

Means for Solving the Problem

According to one aspect of the present invention, there is provided sealing plate, comprising: an explosion-proof valve that is formed on a part of a plate serving as an outer shell of a container of a sealed battery, and that is opened by a pressure rise in the container. In order to achieve the above-explained objective, according to the present invention, the explosion-proof valve is provided with: a thin plate portion that is formed in a part of the plate and that is thinner than the plate; a valve portion that is formed by partially projecting the thin plate portion in a thickness direction to enhance a bending rigidity; and a groove that is drawn as a boundary between the valve portion and the thin plate portion to serves as a score line. the groove does not enclose the valve portion completely and both end portions of the groove are isolated away from each other, and the end portions are aligned with a straight line passing through the valve portion. The sealing plate further comprises: a folding line that extends outside the valve portion in substantially parallel to the straight line on an opposite side of the straight line with respect to a center of the groove; and a rupturable portion between the straight line passing through the end portions of the groove and the folding line that is ruptured after the groove is ruptured. In addition, the valve portion is bent along the folding line to open the explosion-proof valve when the rupturable portion is ruptured after the groove is ruptured.

According to the present invention, a thickness of the valve portion may be identical to a thickness of the thin plate portion, and the valve portion has an arcuate cross-section to protrude toward outside of the container.

According to the present invention, the valve portions and the grooves may be formed symmetrically with each other with respect to the center of the groove in the transverse direction.

According to the present invention, the grooves formed symmetrically with each other may be overlapped with each other at the center.

According to another aspect of the present invention, the thin plate portion may be formed by depressing the plate.

According to the present invention, a ratio of a second length N to a first length D may be set within a range from 18 to 42%, provided that the first length D is an opening range of the valve portion in a direction perpendicular to the straight line, and that the second length N is a distance between the straight line passing through the end portions and the folding line.

According to the present invention, the sealing plate may further comprise a bead formed on a top surface or a bottom surface of the plate to enclose the thin plate portion.

According to the present invention, the thin plate portion may be formed at an intermediate level within a total thickness of a thickness of the plate and a thickness of the bead.

Advantageous Effects of Invention

According to the present invention, when an internal pressure in the container is raised, a shearing force applied to the groove is increased, and eventually the groove is ruptured. The valve portion is curved in the thickness direction to enhance rigidity thereof. In this situation, therefore, the valve portion may maintain the shape thereof without being bent even partially, and the valve portion will not be maintained to be connected to the thin plate portion even partially. Specifically, as a result of rupturing the groove and the rupturable portion, the valve portion is partially detached from the thin plate portion while being bent along the folding line. When the valve portion is ruptured, that is, when the explosion valve is opened, a load to rupture the groove and the rupturable portion acts as a reaction force. A required force to rupture the groove (or rigidity) is governed mainly by a residual thickness of the groove, and a required force to rupture the rupturable portion is governed mainly by a length of the rupturable portion (i.e., a distance between the straight line passing through the end portions of the groove and the folding line). According to the present invention, therefore, a target pressure to open the explosion-proof valve may be set by adjusting the length of the rupturable portion, and even if the valve portion has a large area so that a length of the groove is long, the target pressure to open the explosion-proof valve may be set accurately without variation. In addition, since the rupturable portion is formed, a length of the groove can be shortened so that a repeated stress is received not only by the groove but also by the rupturable portion. Therefore, fracture of the groove due to fatigue may be prevented.

According to the present invention, since the valve portion has the arcuate cross-section to protrude toward outside of the container, an internal stress can be applied homogeneously to an inner surface of the valve portion. Therefore, variation in the target pressure to open the explosion-proof valve may be reduced.

According to the present invention, a pair of the valve portions and a pair of the grooves may be formed symmetrically with each other with respect to the center of the explosion-proof valve. Therefore, an opening area of the explosion-proof valve may be enlarged.

According to the present invention, since the grooves formed symmetrically with each other are overlapped with each other at the center, the valve portions may be opened simultaneously.

According to the present invention, since the thin plate portion is depressed from the plate, the valve portion may be formed within the depressed area. Therefore, the valve portion can be prevented from being damaged.

According to the present invention, since the ratio of the second length N to the first length D falls within a range from 18 to 42%, the target pressure to open the explosion-proof valve may be optimized, and fracture of the groove due to fatigue may be prevented.

According to the present invention, the bead may be formed using a surplus material resulting from forming the thin plate portion by compressing the plate. Therefore, the thin plate portion may be processed easily.

According to the present invention, since the thin plate portion is formed at an intermediate level within the total thickness of the plate and the bead, a sufficient height of the valve portion may be ensured. Therefore, a design freedom of the valve portion may be increased.

DESCRIPTION OF EMBODIMENT(S)

Figure 1:
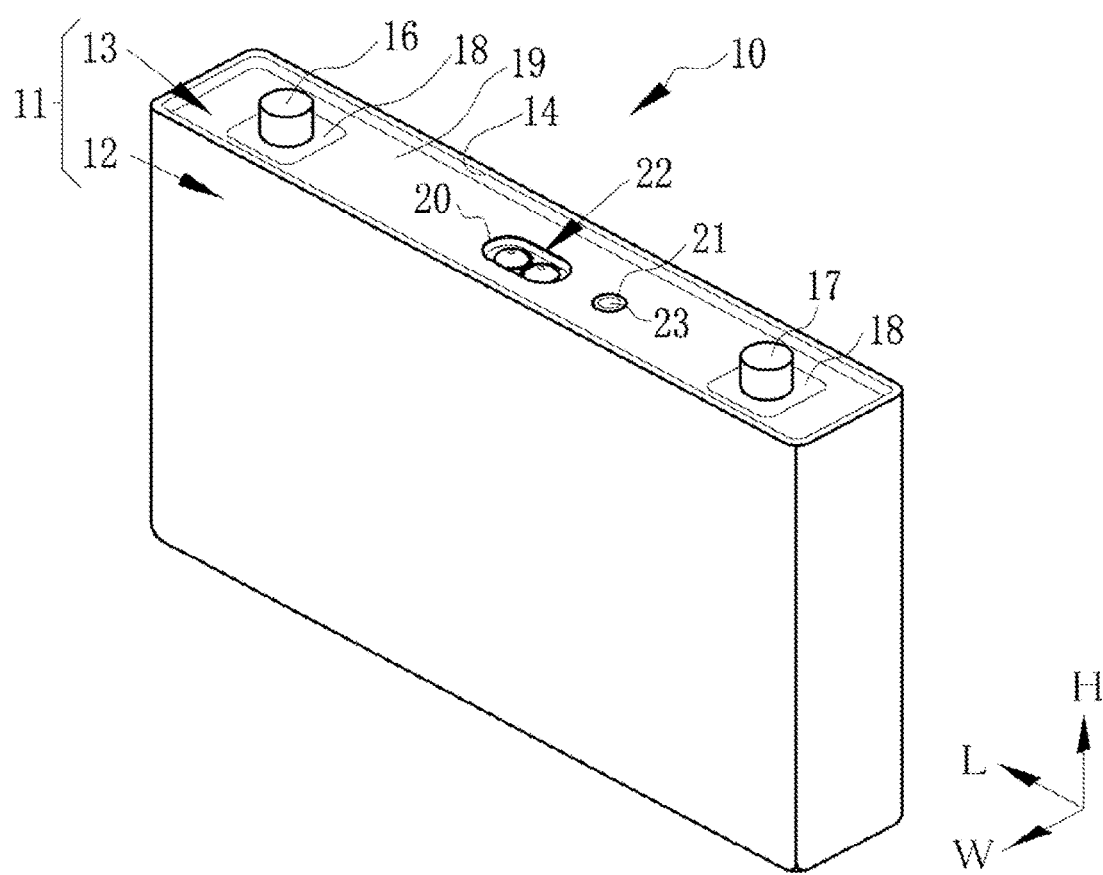
FIG. 1 is a perspective view showing one example of a sealed battery having a sealing plate according to the present invention.
Figure 10:
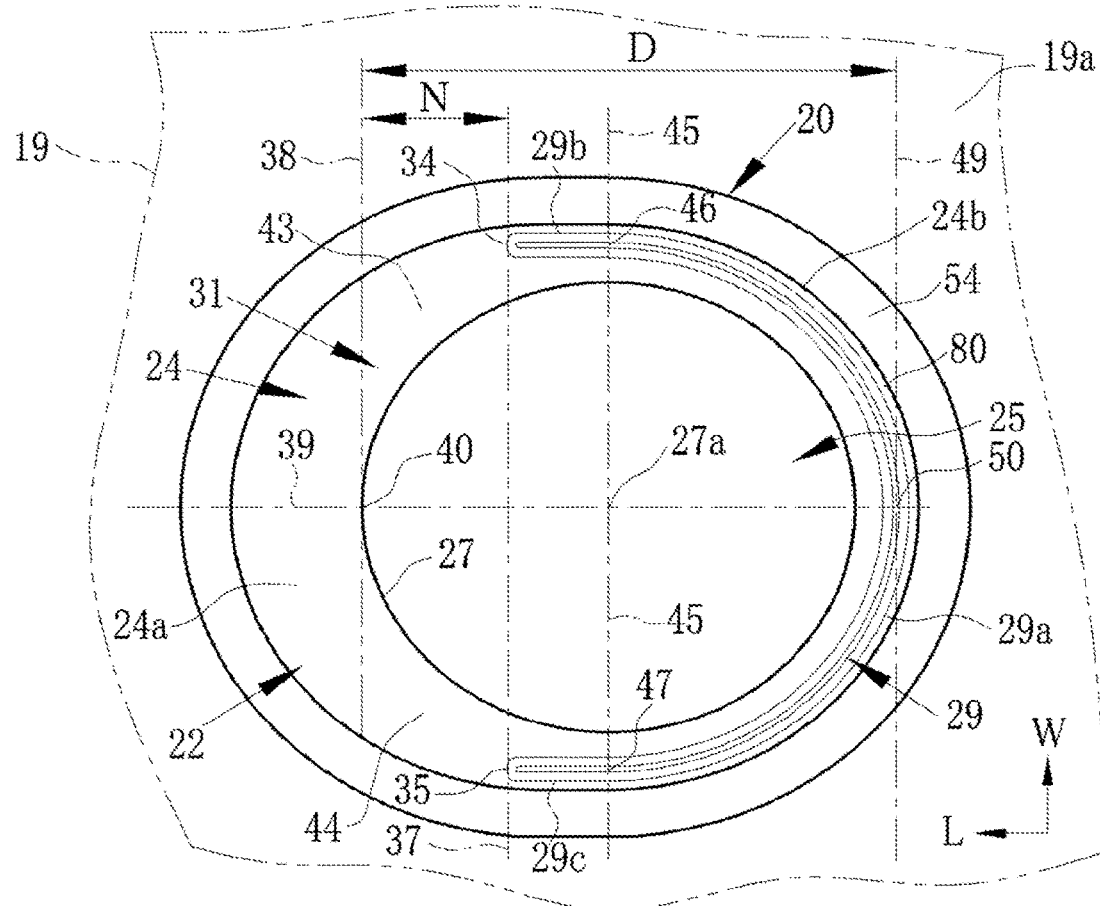
FIG. 10 is a top plan view showing another example of the explosion-proof valve.

Here will be explained an embodiment of a sealed battery according to the present invention with reference to the accompanying drawings. FIG. 10 shows one example of a sealed battery 10 having a sealing plate 13 according to the present invention. As illustrated in FIG. 1, a container 11 of the sealed battery 10 comprises a container body 12 and the sealing plate 13. For example, the container body 12 is formed of a metallic plate, and an opening 14 is formed in an upper section. A battery structure including electrodes and non-aqueous electrolysis solution is held in the container body 12. For example, the sealing plate 13 is formed of a metallic plate such as an aluminum plate and an aluminum alloy plate, and fitted within the opening 14 in such a manner as to maintain an internal space of the container body 12 air-tightly.

For example, given that the sealed battery 10 is a lithium ion secondary battery, the container body 12 formed by deep-drawing an aluminum alloy plate. The sealing plate 13 may be formed by forging an aluminum alloy plate, and for example, the sealing plate 13 may be joined to an inner circumference of the opening 14 by a laser welding method in such a manner as to maintain an air-tight condition. Here, in FIG. 1, H represents a height of the container 11, L represents a (transverse) length of the container 11, and W represents a width (thickness) of the container 11.

The container 11 holds a core together with the electrolysis solution. The core is formed by overlapping a positive plate and a negative plate through a separator, and the core may be wound. A positive terminal 16 and a negative terminal 17 penetrate through the sealing plate 13 from inside of the container 11 to be exposed outside while being fixed to the sealing plate 13 respectively through an insulating member 18. The positive terminal 16 and the negative terminal 17 are arranged in juxtaposition in the transverse direction L. The container 11 is shaped into a flat cuboid shape in which the width W is shorter than the transverse length L. The positive terminal 16 and the negative terminal 17 are exposed on both sides of a central portion of the sealing plate 13 in the transverse direction L. Here, the container 11 may also be shaped into e.g., a cylindrical shape.

The sealing plate 13 comprises a plate 19, a surface depression 20, and a liquid inlet 21. The surface depression 20 is formed integrally with the plate 19 on a center of the container 11 not only in the transverse direction L but also in the width direction W, and an explosion-proof valve 22 is formed within the surface depression 20. The liquid inlet 21 is formed adjacent to the explosion-proof valve 22 while being isolated in a predetermined distance therefrom, and the non-aqueous electrolysis solution is supplied from the liquid inlet 21. After supplying the non-aqueous electrolysis solution, the liquid inlet 21 is closed by a plug 23 in such a manner that the liquid inlet 21 is not to be opened even if an internal pressure is raised higher than an opening pressure at which the explosion-proof valve 22 is opened.

Figure 2:
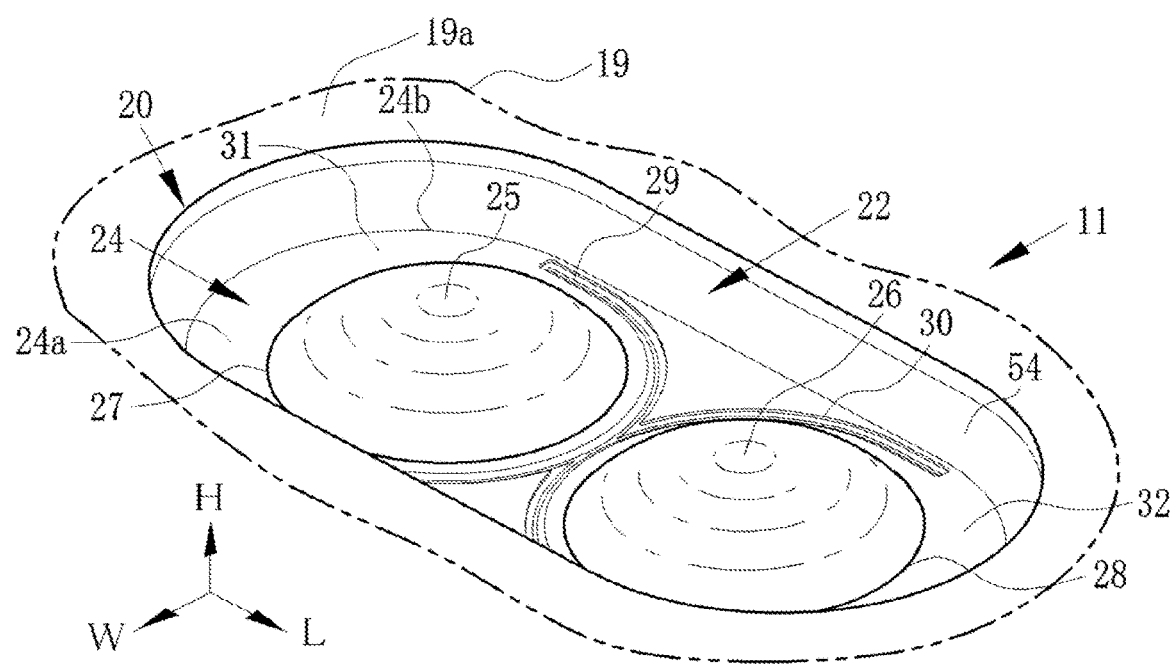
FIG. 2 is a perspective view showing one example of an explosion-proof valve.

One example of the explosion-proof valve 22 is shown in FIG. 2. As illustrated in FIG. 2, the surface depression 20 has an oval (ellipsoidal) profile which is longer in the transverse direction L. In the surface depression 20, a thin plate portion 24 is formed integrally with the plate 19. The explosion-proof valve 22 is formed integrally with the thin plate portion 24 within a predetermined area of a top surface 24a (or a bottom surface of the surface depression 20) of the thin plate portion 24. The thin plate portion 24 comprises a first valve portion 25, a second valve portion 26, a first outline 27, a second outline 28, a first groove 29, a second groove 30, a first rupturable portion 31, and a second rupturable portion 32. The first valve portion 25 and the second valve portion 26 are individually formed by partially projecting the thin plate portion 24 in a thickness direction, and a height of each of the first valve portion 25 and the second valve portion 26 is individually lower than a top surface 19a of the plate 19. Since the first valve portion 25 and the second valve portion 26 are lower than the top surface 19a of the plate 19, the first valve portion 25 and the second valve portion 26 will not be subjected to an external force directly. However, the first valve portion 25 and the second valve portion 26 my also be formed higher than the top surface 19a of the plate 19.

Figure 3:
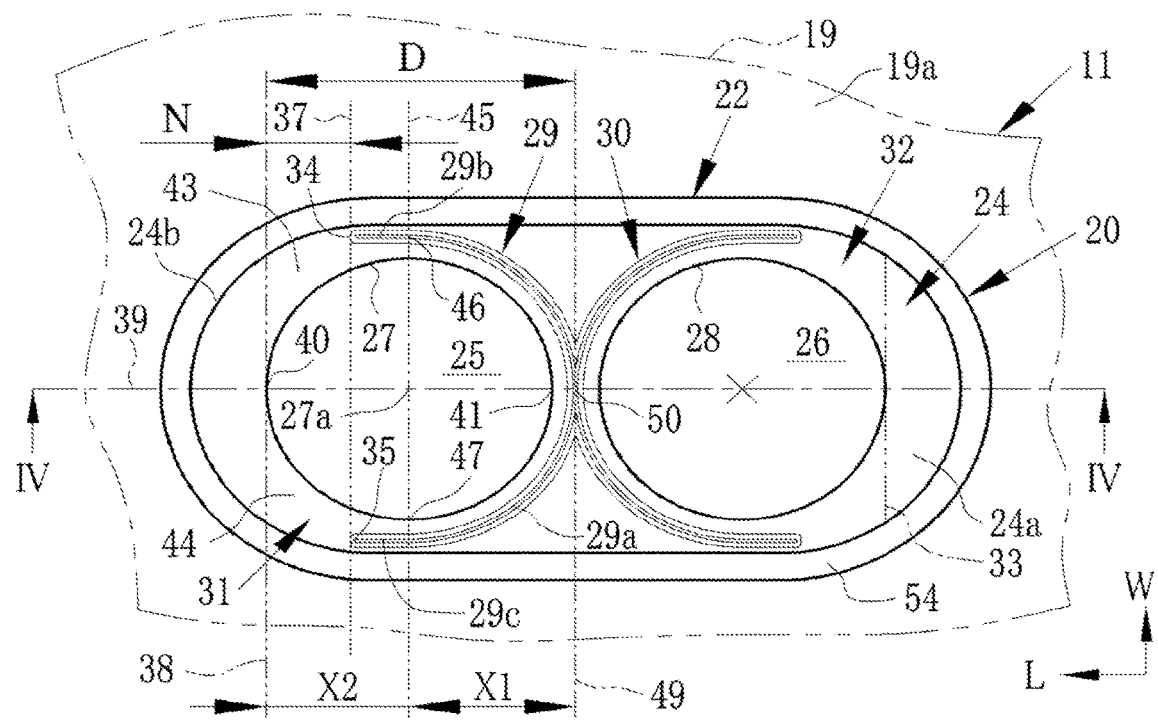
FIG. 3 is a top plan view showing one example of the explosion-proof valve.

One example of the explosion-proof valve 22 is shown in FIG. 3. As illustrated in FIG. 3, the first valve portion 25 has the first outline 27 which is closed in a planer view, and the first valve portion 25 formed within the first outline 27 protrudes toward outside of the container 11. That is, the first valve portion 25 bulges outwardly. Therefore, the first valve portion 25 has a sufficient rigidity so that the first valve portion 25 will not be bent and deformed within the first outline 27 when the explosion-proof valve 22 is opened. In FIG. 3, the first outline 27 is drawn as a profile enclosing the first valve portion 25 bulging out from the top surface 24a. The first outline 27 may be a circular outline in a planer view. Here, the first outline 27 may also be an oval (ellipsoidal) profile which is longer in the transverse direction L of the container 11.

The first groove 29 as a score line is a boundary drawn between the first valve portion 25 and the thin plate portion 24. Specifically, the first groove 29 is formed into an arcuate groove enclosing the first outline 27 incompletely, and end portions (i.e., one end 34 and the other end 35) are not joined to each other. Instead, the first groove 29 may also be formed by combining straight grooves extending from the end portions 34 and 35 with an arcuate groove formed between those straight grooves. Further, the first groove 29 may also be formed into a polygonal groove.

The one end 34 and the other end 35 are aligned with a first straight line 37 passing through the first valve portion 25 in the width direction W. In the example shown in FIG. 3, a region enclosed by the first outline 27 is divided into a zone X1 enclosed by the first groove 29 and a zone X2 of an opening side opposite to the zone X1, by a center line 45 passing through a center point 27a of the first outline 27 in the width direction W. Preferably, as illustrated in FIG. 3, the one end 34 and the other end 35 are aligned with the first straight line 37 extending in the zone X2 in parallel with the center line 45. Here, the first straight line 37 is one example of a straight line of the embodiment of the present invention.

The one end 34 is situated on one side of the center point 27a of the first outline 27 (above the center point 27a in FIG. 3), and the other end 35 is situated on the other side of the center point 27a of the first outline 27 (below the center point 27a in FIG. 3). That is, the one end 34 and the other end 35 are situated symmetrically across a second straight line 39 extending perpendicular to the first straight line 37 while passing through the center point 27a.

When the explosion-proof valve 22 is opened, the first valve portion 25 is bent along a folding line 38. The folding line 38 extends outside the first valve portion 25 in substantially parallel to the first straight line 37 on an opposite side of the straight line 37 with respect to a center 50. In the thin plate portion 24, a portion between the first straight line 37 passing through the one end 34 and the other end 35 of the first groove 29 and the folding line 38 serves as the first rupturable portion 31. When the first valve portion 25 is opened, the first groove 29 is ruptured, and then the first outline 27 within the first rupturable portion 31 is ruptured. As a result, the first valve portion 25 is folded along the folding line 38. Specifically, the second straight line 39 extends in the transverse direction L while passing through a right intersection 41, the center point 27a, and a left intersection 40 of the first outline 27. That is, the folding line 38 extends perpendicular to the second straight line 39, and tangent to the first outline 27 while passing through the left intersection 40 between the second straight line 39 and the first outline 27 in the zone X2 of the opening side.

In practice, when the first valve portion 25 is opened, the first valve portion 25 is folded at a portion slightly away from the folding line 38 in the opposite side to the first outline 27. This is because the first valve portion 25 has a sufficient rigidity not to be deformed within the first outline 27. Therefore, the folding line 38 shown in FIG. 3 is a virtual line.

The first rupturable portion 31 is enclosed by the first outline 27, an outer circumference 24b of the top surface 24a, the first straight line 37, and the folding line 38, and the first rupturable portion 31 includes a first upper rupturable portion 43 and a first lower rupturable portion 44. The first upper rupturable portion 43 is ruptured from the one end 34 to the folding line 38 after the first groove 29 is ruptured, and the first lower rupturable portion 44 is ruptured from the other end 35 to the folding line 38 after the first groove 29 is ruptured.

The first groove 29 includes a curved portion 29a extending around the first outline 27 while passing through the center 50. In other words, the curved portion 29a is an arcuate groove formed on the opposite side to first straight line 37. The first groove 29 further includes: a straight end portion 29b extending from an upper intersection 46 between the first groove 29 and the center line 45 to the one end 34 in parallel to the second straight line 39 while keeping a predetermined distance from the outer circumference 24b; and other straight end portion 29c extending from a lower intersection 47 between the first groove 29 and the center line 45 to the other end 35 in parallel to the second straight line 39 while keeping a predetermined distance from the outer circumference 24b. By thus forming the straight end portion 29b and the other straight end portion 29c in parallel to the second straight line 39, the first rupturable portion 31 is raptured substantially linearly when the first valve portion 25 is opened. Therefore, the valve opening pressure can be adjusted easily.

If a ratio of a second length N of the first rupturable portion 31 in which the first groove 29 is not formed to a first length D as an opening range of the first valve portion 25 is greater than a predetermined ratio, a length of the first rupturable portion 31 in the transverse direction L may be too long. The first length D is a shortest distance between the folding line 38 and a center line 49 extending in parallel to the first straight line 37 while passing through the center 50 as an intersection between first groove 29 and the second straight line 39. The second length N is a shortest distance between the first straight line 37 passing through the end portions 34 and 35 and the folding line 38. If the length of the first rupturable portion 31 in the transverse direction L is long, the length of the first groove 29 in the transverse direction L is reduced. Consequently, a required force to rupture the first rupturable portion 31 (or rigidity) is increased, and the first valve portion 25 becomes difficult to be opened.

By contrast, if the ratio of the second length N to the first length D is smaller than the predetermined ratio, the length of the first rupturable portion 31 in the transverse direction L may be too short. If the length of the first rupturable portion 31 in the transverse direction L is short, the length of the first groove 29 in the transverse direction L is increased. Consequently, the required force to rupture the first rupturable portion 31 (or rigidity) is reduced, and the first valve portion 25 becomes easy to be opened. That is, the required force to rupture the first rupturable portion 31 (or rigidity) is governed mainly by the second length N. Since the first rupturable portion 31 is formed, the length of the first groove 29 (the first length D—the second length N) is shortened so that a repeated stress is received not only by the first groove 29 but also by the first rupturable portion 31. Therefore, the length of the first rupturable portion 31 may be employed as a parameter to avoid or prevent fracture of the first groove 29 due to fatigue.

That is, by adjusting the ratio of the second length N to the first length D, the rigidity may be adjusted in such a manner as to set the valve opening pressure to a desirable level while preventing the first groove 29 from being ruptured undesirably by the repeated stress. Specifically, it is preferable to set the ratio of the second length N to the first length D within a range from 18 to 42%.

The ratio of the second length N to the first length D varies depending on e.g., a hardness of the plate 19. The hardness of the plate 19 is governed by material and a thickness of the thin plate portion 24. Parameters representing a hardness of the material include elastic intensity, yield strength, rupture (fracture) strength, (maximum) tensile strength, creep deformation strength (temporal change under a small load), fatigue strength, wear (abrasion) resistance and so on. That is, it is also possible to adjust the ratio of the second length N to the first length D by varying the above-mentioned parameters.

The second valve portion 26, the second groove 30, the second rupturable portion 32, and a second folding line 33 are formed symmetrically with respect to the first valve portion 25, the first groove 29, the first rupturable portion 31, and the folding line 38, across the center line 49. In addition, the first groove 29 and the second groove 30 are overlapped with each other on the center line 49. Here, the center 50 is a center point of the surface depression 20.

Figure 4:
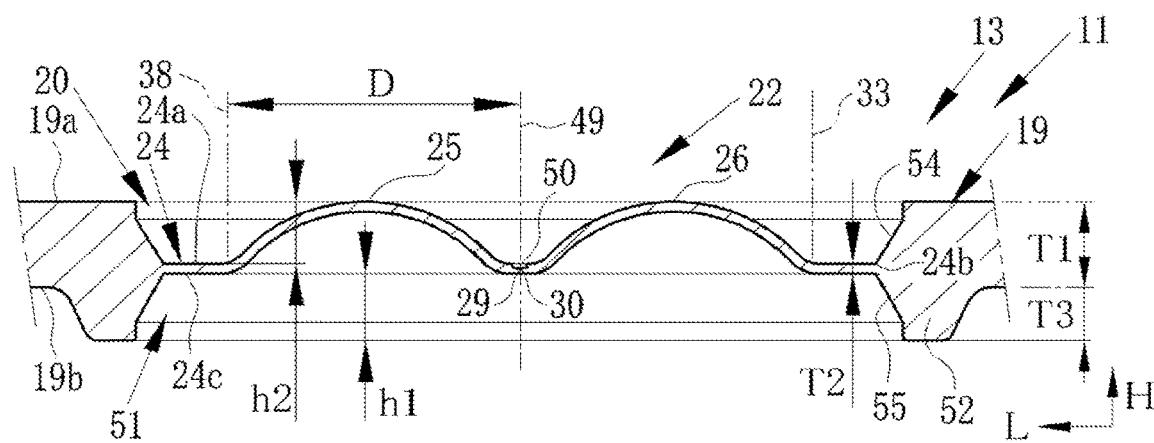
FIG. 4 is a cross-sectional view along the IV-IV line shown in FIG. 3.

FIG. 4 is a cross-sectional view along the IV-IV line shown in FIG. 3. For example, the thin plate portion 24 may be formed by a forging method. Specifically, as shown in FIG. 4, the thin plate portion 24 is formed by compressing the plate 19 between an upper mold and a lower mold in such a manner as to reduce a thickness T2 of the thin plate portion 24 thinner than a thickness T1 of the plate 19. As a result of forming the thin plate portion 24 by the forging method, a bottom surface depression 51 is formed at a location where an outline of the bottom surface depression 51 is consistent with that of the surface depression 20. Thereafter, the first valve portion 25, the second valve portion 26, the first groove 29, and the second groove 30 are formed in the thin plate portion 24 by a coining method. Each of the first valve portion 25 and the second valve portion 26 has an arcuate cross-section to protrude toward outside of the container 11, and a thickness of each of the first valve portion 25 and the second valve portion 26 is substantially identical to the thickness T2.

As a result of forming the thin plate portion 24 by the compression process, a surplus material is generated in the plate 19. In order to facilitate the forming process, such surplus material is pushed toward a common outer circumference of the surface depression 20 and the bottom surface depression 51 by inclined portions of the upper mold and the lower mold. A volume of the surplus material is increased with an increase in a compression rate of the thin plate portion 24, in other words, with a reduction in a ratio of the thickness T2 of the thin plate portion 24 to the thickness T1 of the plate 19. Consequently, an amount of the surplus material pushed toward the common outer circumference of the surface depression 20 and the bottom surface depression 51 is increased. After the compressing process, the surplus material thus pushed is shaped into a bead 52 enclosing the bottom surface depression 51 by a trimming (or reforming) process. The bead 52 has a constant width and a constant height toward an inner space of the container 11. In addition, a surface of the bead 52 is smoothened to improve an appearance of the bead 52 and to ensure safety of a worker.

The top surface 24a of the thin plate portion 24 is formed at a level closer to the bottom surface depression 51 than an intermediate level within the thickness T1 of the plate 19. That is, since the bead 52 is formed on a bottom surface 19b, the thin plate portion 24 may be formed at a level where a depth h1 of the bottom surface depression 51 including a thickness T3 of the bead 52 and a depth h2 of the surface depression 20 are equalized. In other words, the thin plate portion 24 may be formed at an intermediate level within a total thickness of the thickness T1 of the plate 19 and the thickness T2 of the bead 52. Therefore, the top surface 24a of the thin plate portion 24 may be formed at a level deeper than the intermediate level within the thickness T1 of the plate 19 so as to ensure sufficient heights of the first valve portion 25 and the second valve portion 26. For this reason, a design freedom of the cross-sectional shapes of the first valve portion 25 and the second valve portion 26 may be ensured so as to receive the internal pressure homogeneously.

Instead, the bead 52 may also be formed on the top surface 19a of the plate 19. In addition, an upper inclined surface 54 is formed on a side wall of the surface depression 20 (erected from the top surface 24a to the top surface 19a), and the inclined portion of the upper mold is pushed onto the upper inclined surface 54 to push the surplus material toward the outer circumference of the surface depression 20. Likewise, a lower inclined surface 55 is formed on a side wall of the bottom surface depression 51, and the inclined portion of the lower mold is pushed onto the lower inclined surface 55 to push the surplus material toward the outer circumference of the bottom surface depression 51.

Figure 5:
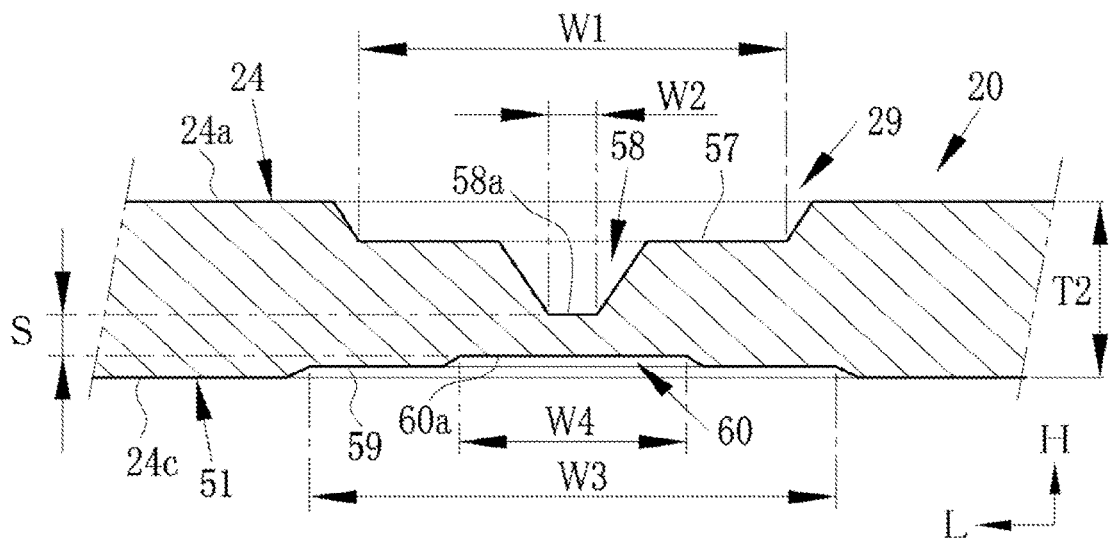
FIG. 5 is an expanded cross-sectional view showing one example of a first groove.

One example of the first groove is shown in FIG. 5. Here, the first groove 29 shown in FIG. 5 is merely an example of the first groove, and a configuration of the first groove should not be limited to a configuration shown in FIG. 5. As illustrated in FIG. 5, in order to improve a dimension accuracy of a residual thickness S, a step portion is formed on each of the top surface 24a and a bottom surface 24c of the thin plate portion 24 by e.g., a compression method. On the top surface 24a, a first step portion 57 and a second step portion 58 are formed. The first step portion 57 is formed such that a width W1 in the transverse direction L of the container 11 is relatively longer. The second step portion 58 is formed within the first step portion 57, and a width W2 in the transverse direction L is narrower than the width W1. A depth of the second step portion 58 is deeper than e.g., a depth of the first step portion 57.

A third step portion 59 and a fourth step portion 60 are formed on the bottom surface 24c. The fourth step portion 60 is formed within the third step portion 59, and a width W4 in the transverse direction L is narrower than a width W3 of the third step portion 59. In order to absorb an expected misalignment of centers of the upper mold and the lower mold, the width W4 of the fourth step portion 60 is set wider than the width W2 of the second step portion 58. In order to absorb the expected misalignment of the centers of the upper mold and the lower mold, the width W3 of the third step portion 59 is set wider than the width W1 of the first step portion 57. A width of the third step portion 59 and a width of the fourth step portion 60 are shallower than e.g., the depth of the first step portion 57.

The residual thickness S of the first groove 29 is comparable to a thickness between a bottom surface 58a of the second step portion 58 and a bottom surface 60a of the fourth step portion 60, and the residual thickness S of the first groove 29 may be a parameter to control the required force to rupture the first groove 29 (rigidity). A cross-sectional shape of the second groove 30 is similar to the cross-sectional shape of the first groove 29, therefore, detailed explanation for the second groove 30 will be omitted. Here, a cross-sectional shape of the groove in the transverse direction L at the center 50 shown in FIG. 3 where the first groove 29 and the second groove 30 are overlapped with each other is similar to the cross-sectional shape shown in FIG. 5.

Figure 6:
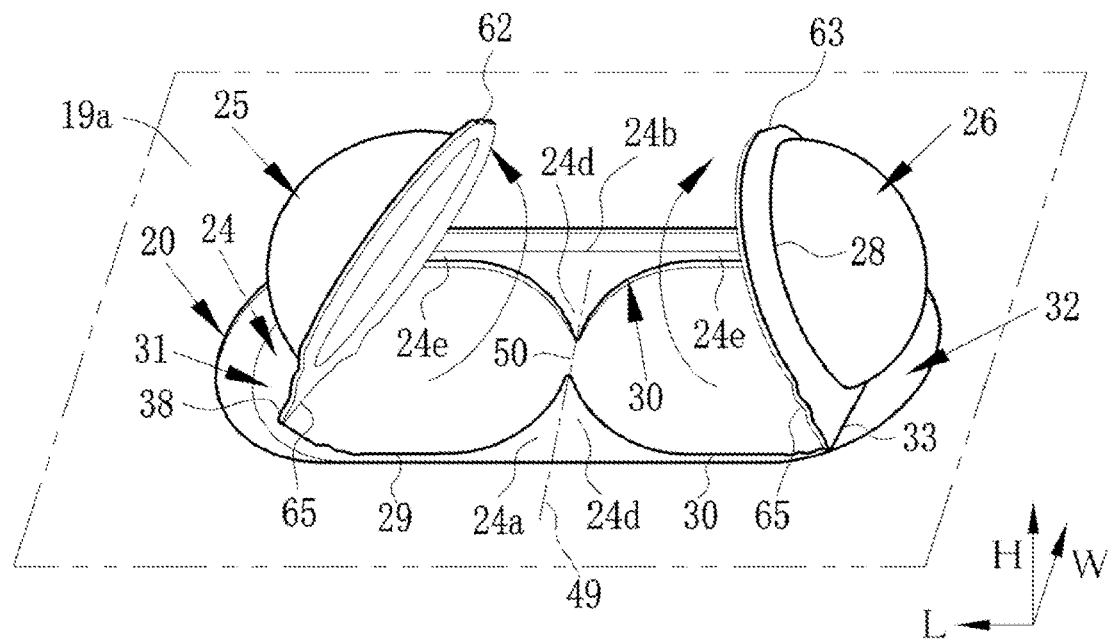
FIG. 6 is a perspective view showing the opened explosion-proof valve viewed from a top surface.

FIG. 6 shows the opened explosion-proof valve 22. As illustrated in FIG. 6, the first valve portion 25 is bent along the first folding line 38 when it is opened, and the second valve portion 26 is bent along the second folding line 33 when it is opened. That is, when the first valve portion 25 and the second valve portion 26 are opened, the first valve portion 25 and the second valve portion 26 are isolated away from each other in the transverse direction L like a double door. The center 50 is separated into joint portions 62, 63 in the vicinity of the center line 49. A central region 24d between each of the joint portions 62 and 63 and the outer circumference 24b is wider than an outer region 24e between the remaining portion of each of the first groove 29 and the second groove 30 and the outer circumference 24b. Therefore, the central region 24d is easier to be bent, and hence the central region 24d is more difficult to be raptured. By contrast, since the outer circumference 24b is situated close to the outer region 24e, the outer region 24e is difficult to be bent and easier to be ruptured.

Since the joint portions 62 and 63 are easier to be bent, the joint portions 62 and 63 are expanded and compressed by the repeated stress to be elastically deformed. A load to rupture the joint portions 62 and 63 against the elastic force will act on the joint portions 62 and 63 to open the explosion-proof valve 22. A tensile strength against the load acting on the joint portions 62 and 63 is stronger than the force required to rupture portions of the first groove 29 and the second groove 30 other than the joint portions 62 and 63, and a force required to rupture a rupturable section 65 including the first rupturable portion 31 and the second rupturable portion 32. Therefore, the joint portions 62 and 63 will be ruptured slightly after the portions of the first groove 29 and the second groove 30 other than the joint portions 62, 63 and the rupturable section 65 are ruptured.

Before the joint portions 62 and 63 are ruptured, the inner surfaces of the first valve portion 25 and the second valve portion 26 are homogeneously subjected to the internal pressure of the container 11 and the repeated stress. When the internal pressure of the container 11 exceeds shear rigidity of the first groove 29 and the second groove 30, the first groove 29 and the second groove 30 are ruptured, and consequently, the first valve portion 25 and the second valve portion 26 are opened substantially simultaneously. In addition, the first valve portion 25 and the second valve portion 26 may be opened widely at e.g., 45 degrees with respect to top surface 24a.

Figure 7:
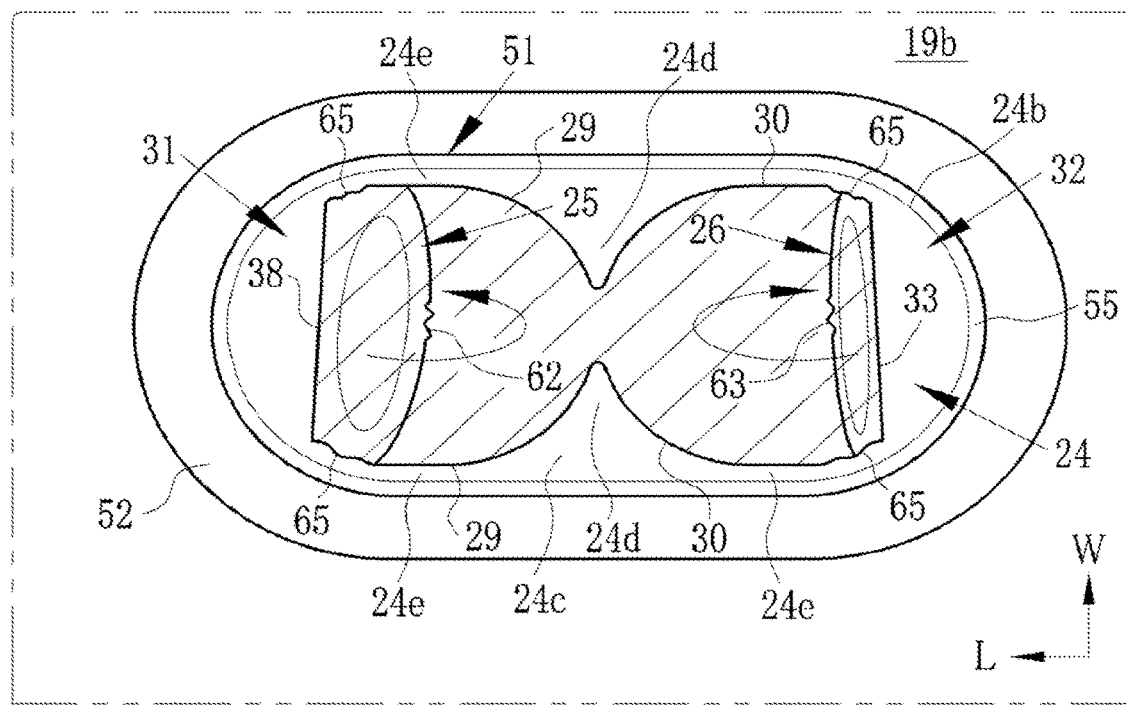
FIG. 7 is a perspective view showing the explosion-proof valve shown in FIG. 6 viewed from a bottom surface.

FIG. 7 shows the bottom surface of the opened explosion-proof valve 22. In FIG. 7, a hatched area is an opened area of the thin plate portion 24. As a result that the first groove 29, the first rupturable portion 31, and the joint portion 62 are ruptured, the first valve portion 25 is bent outwardly along the first folding line 38. As a result that the second groove 30, the second rupturable portion 32, and the joint portion 63 are ruptured, the second valve portion 26 is bent outwardly along the second folding line 33. The central region 24d is wider than the outer region 24e.

Figure 8:
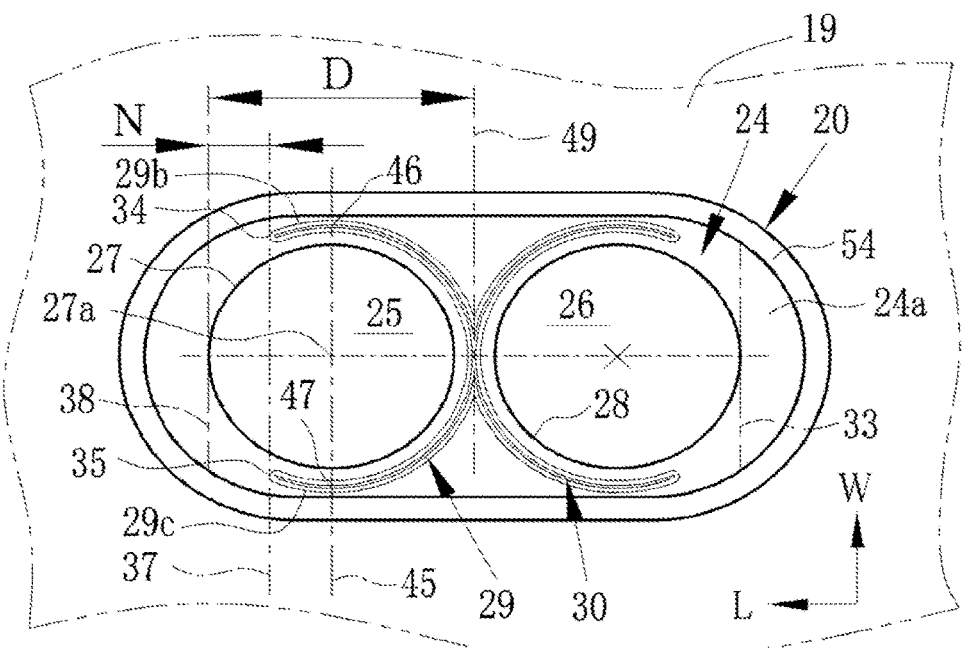
FIG. 8 is a top plan view showing another example of the first groove and a second groove.

FIG. 8 shows another example of the first groove 29 and the second groove 30. According to another example, the end portion 29b between the one end 34 and the upper intersection 46 is curved along the first outline 27 to have a same curvature as the remaining portion of the first groove 29. Likewise, the end portion 29c between the other end 35 and the lower intersection 47 is curved along the first outline 27 to have the same curvature as the remaining portion of the first groove 29. The curvatures of the end portions 29b and 29c may be varied according to need. As illustrated in FIG. 8, according to another example, the second groove 30 is formed symmetrically with respect to the first groove 29 across the center line 49. In FIG. 8, common reference numerals are allotted to the elements in common with those shown in FIG. 3, and detailed explanations therefore will be omitted.

Practical Example

A result of validation of the sealing plate 13 according to the present invention is shown in Table 1. In order to carry out the validation, the sealing plates No. 1 to No. 4 were prepared. In the sealing plates No. 1 to No. 4, the second length N were set to 1.2, 1.4, 1.8, and 2.2 (mm) respectively, and the residual thicknesses S of the first groove 29 and the second groove 30 were set to 100, 80, 60, and 40 (μm) respectively. In the validation, an experiment system is used to measure a level of a pressure (Mpa) at which the explosion-proof valve 22 of each of the sealing plates No. 1 to No. 4 was opened, and a number of stress at which the explosion-proof valve 22 of each of the sealing plates No. 1 to No. 4 was opened. Those parameters were measured while changing the pressure applied to the explosion-proof valve 22 repeatedly from an atmospheric pressure to a predetermined level higher than the atmospheric pressure, and from the predetermined level to the atmospheric pressure. A routine to increase the pressure to the predetermined level and reducing the pressure to the atmospheric pressure was counted as one cycle, and the numbers of cycles at which the explosion-proof valve 22 of each sealing plate was opened (fatigue lives) are listed in the Table 1.

TABLE 1

|  | Comparative Example 1 | No. 1 | No. 2 | No. 3 | No. 4 | Comparative Example 2 |
| --- | --- | --- | --- | --- | --- | --- |
| N (mm) | 1 | 1.2 | 1.4 | 1.8 | 2.2 | 2.4 |
| N/D · 100 (%) | 17.8 | 21.4 | 25 | 32.1 | 39.3 | 42.9 |
| Residual thicknesses S of 1st and 2nd grooves | 120 | 100 | 80 | 60 | 40 | 30 |
| Opening Pressure (Mpa) | 2 | 2 | 2 | 2 | 2 | 2.6 |
| Number of cycles | 27000 | 30000 | 32000 | 34000 | 30000 | 14000 |

Figure 9:
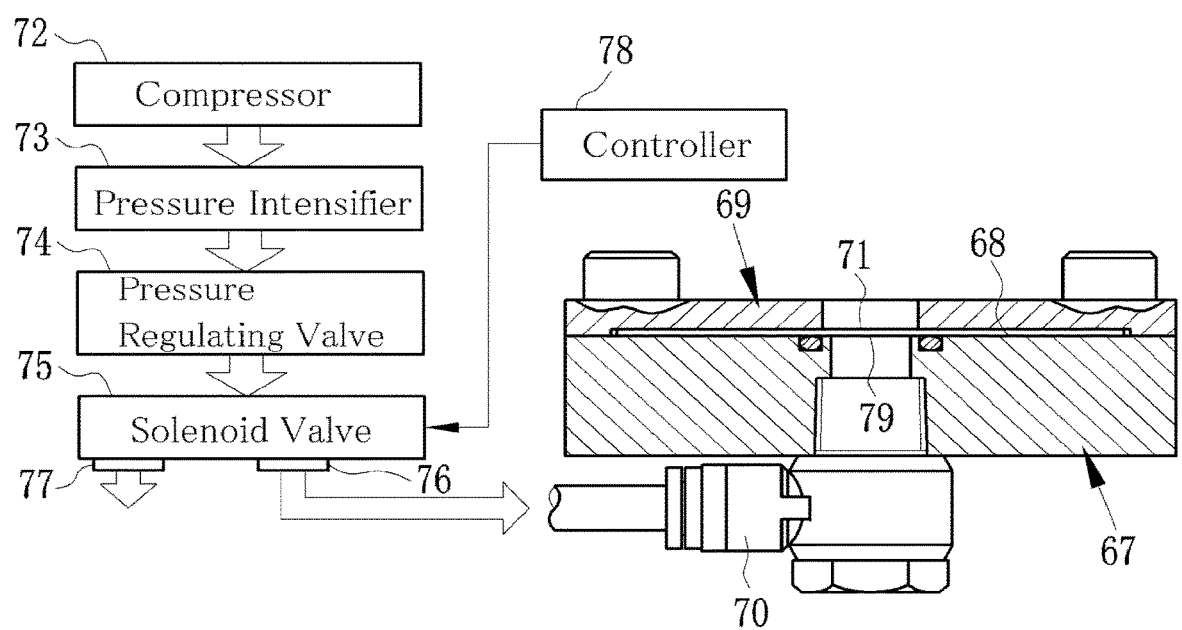
FIG. 9 is an explanatory view showing an experiment system used in a test.

As illustrated in FIG. 9, in the experiment system, the above-mentioned sealing plate was set on a holding section 68 of a table 67 while being pressed by a holding plate 69 from above. A pipe 70 for suppling air to the explosion-proof valve 22 is attached to the table 67, and the air supplied though the pipe 70 is blown from an outlet 79 to the explosion-proof valve 22 from below. An opening 71 is formed on holding plate 69 to visually inspect a condition of the explosion-proof valve 22 therethrough. The air is compressed by a compressor 72, and the compressed air is delivered to a pressure intensifier 73 and a pressure-regulating valve 74 sequentially to be regulated to the predetermine level. The compered air thus regulated to the predetermined level is further delivered to a solenoid valve 75. The solenoid valve 75 comprises a first port 76 selected to deliver the air regulated to the predetermined level to the pipe 70, and a second port 77 selected to deliver the atmospheric air to the pipe 70. The port of the solenoid valve 75 is switched between the first port 76 and the second port 77 by a controller 78 repeatedly at predetermined intervals so as to apply the repeated stress to the explosion-proof valve 22.

Each of the sealing plates No. 1 to No. 4 was formed by pressing an aluminum alloy plate whose thickness T1 was 2.0 mm from both sides to form the thin plate portion 24, the first valve portion 25, and the second valve portion 26. In the thin plate portion 24, the transverse length L was set 16.2 mm, the width W was set to 8.2 mm, and the thickness T2 was set to 0.25 mm. The first valve portion 25 was shaped into a domed shape in which a height from the top surface 24a was 1.3 mm, and a radius of the first outline 27 was 2.8 mm. Configurations of the second valve portion 26 were similar to those of the first valve portion 25. Thereafter, the aluminum alloy plate was trimmed to be fitted within the opening 14.

The sealing plates No. 1 to No. 4 used in the validation were prepared in such a manner that the explosion-proof valve 22 will be opened when the pressure applied thereto is raised to 2 Mpa, but will not be opened until subjected to the above-explained repeated stress more than 30000 times.

Specifically, in the sealing plates No. 1 to No. 4, a combination of the second length N and the residual thickness S are altered in such a manner that the explosion-proof valve 22 will be opened when the pressure applied thereto is raised to 2 Mpa.

A shear rigidity of each of the first groove 29 and the second groove 30 are increased by increasing the residual thickness S. That is, the first groove 29 and the second groove 30 become more difficult to be ruptured. If the second length N is reduced, that is, if the ratio of the second length N to the first length D is relatively small, the rigidity of each of the first valve portion 25 and the second valve portion 26 is reduced. That is, the first valve portion 25 and the second valve portion 26 become easier to be opened.

In the sealing plate No. 1, the ratio of the second length N to the first length D was 21.4%, and the residual thickness was 100 μm. In the sealing plate No. 2, the ratio of the second length N to the first length D was 25%, and the residual thickness was 80 μm. In the sealing plate No. 3, the ratio of the second length N to the first length D was 32.1%, and the residual thickness was 60 μm. In the sealing plate No. 4, the ratio of the second length N to the first length D was 39.3%, and the residual thickness was 40 μm.

As can be seen from Table 1, the explosion-proof valves 22 of the sealing plates No. 1 to No. 4 thus designed to be opened by the pressure of 2 Mpa were not opened until subjected to the repeated stress more than 30000 times.

The sealing plate according to the comparative example 1 was also designed in such a manner that the explosion-proof valve 22 is opened when the pressure applied thereto is raised to 2 Mpa. To this end, in the sealing plate according to the comparative example 1, the second length N was set to 1 mm, and the residual thicknesses S of the first groove 29 and the second groove 30 were set to 120 μm. However, in the sealing plate according to the comparative example 1, the explosion-proof valve 22 was opened before subjected to the repeated stress 30000 times. That is, if the second length N is reduced, the internal pressure and the repeated stress applied to e.g., the first groove 29 is increased. In this case, if the residual thickness S of e.g., the first groove 29 is too small, the first groove 29 will be ruptured before subjected to the repeated stress 30000 times. In order to bear against the repeated stress 30000 times, the residual thickness S of each of the first groove 29 and the second groove 30 has to be increased. However, if the residual thickness S of each of the first groove 29 and the second groove 30 is increased in the sealing plate according to the comparative example 1, the explosion-proof valve 22 will not be opened even if the pressure applied thereto is raised to 2 Mpa. Thus, if the second length N is shorter than that of the sealing plate No. 1 and the residual thickness S is thicker than that of the sealing plate No. 1, the explosion-proof valve 22 will not be opened even if the pressure applied thereto is raised to 2 Mpa.

By contrast, in order to enhance the rigidity of the explosion-proof valve 22, the second length N of the sealing plate according to the comparative example 2 was set to 2.4 mm that is longer than that of the sealing plate No. 4. In the sealing plate according to the comparative example 2, the residual thickness S of each of the first groove 29 and the second groove 30 was reduced to 30 μm. However, the explosion-proof valve 22 of the sealing plate according to the comparative example 2 was not opened even when the pressure applied to the explosion-proof valve 22 was increased to 2 Mpa. If the residual thickness S of each of the first groove 29 and the second groove 30 is thus reduced to 30 μm, the first groove 29 and the second groove 30 were raptured too easily. Therefore, the residual thickness S of each of the first groove 29 and the second groove 30 could not be reduced thinner than 30 μm. In addition, in the sealing plate according to the comparative example 2 the explosion-proof valve 22 was opened way before subjected to the repeated stress 30000 times.

Based on the result of the validation, the inventors of the present invention have found that the explosion-proof valve 22 can be opened by applying the pressure of 2 Mpa thereto, but the explosion-proof valve 22 will not be opened until subjected to the repeated stress around 30000 times, if the second length N and the residual thickness S fall within the ranges of those parameters of the sealing plates No. 1 to No. 4. Those values shown in Table 1 may also be applied to the sealing plate 13 shown in FIG. 8.

Although the above exemplary embodiments of the present invention have been described, it will be understood that the present invention should not be limited to the described exemplary embodiments, and various changes and modifications can be made within the scope of the present invention.

For example, the second valve portion 26 and the second groove 30 shown in FIGS. 3 and 8 may be omitted. According to another example shown in FIG. 10, only the first valve portion (as will be simply called the "valve portion" hereinafter) 25 and the first groove (as will be simply called the "groove" hereinafter) 29 are formed on the thin plate portion 24 to serve as the explosion-proof valve 22. The outer circumference 24b is formed on the opposite side to the first straight line 37 around the groove 29 while maintaining a clearance 80 to the groove 29 homogenously.

Figure 11:
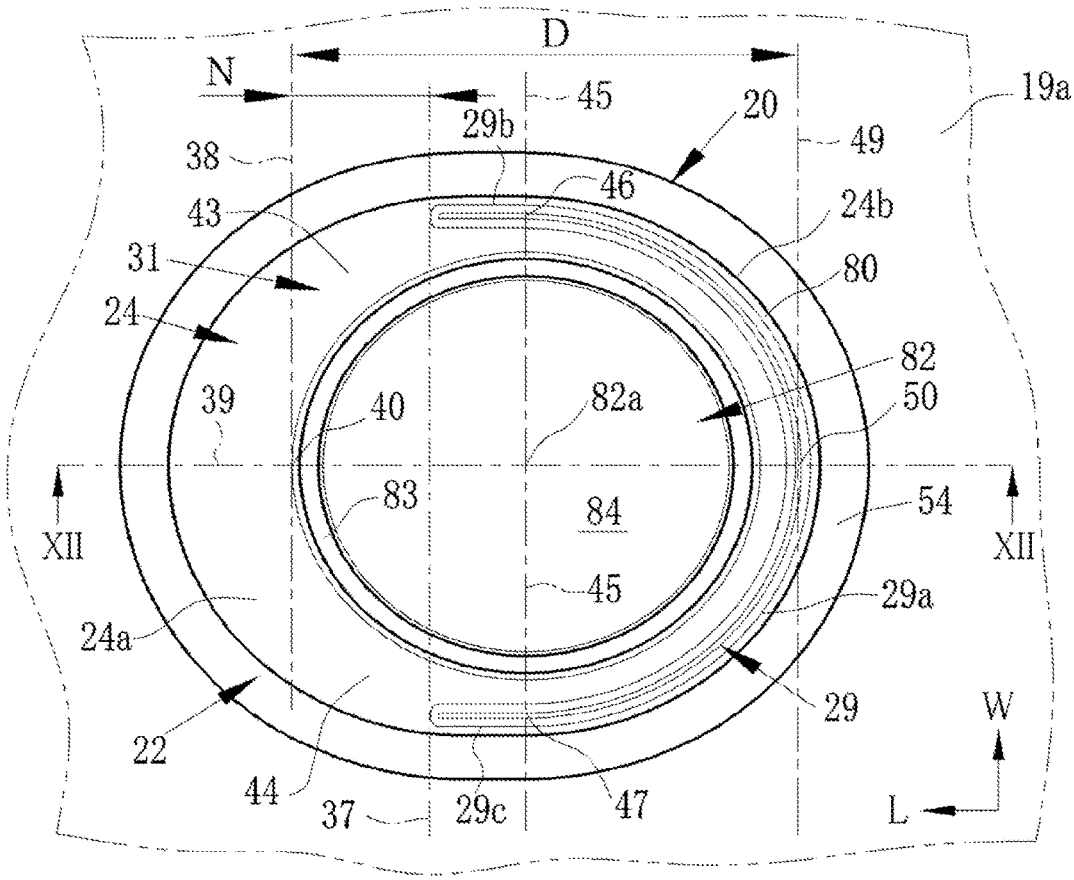
FIG. 11 is a top plan view showing another example of an opening portion.
Figure 12:
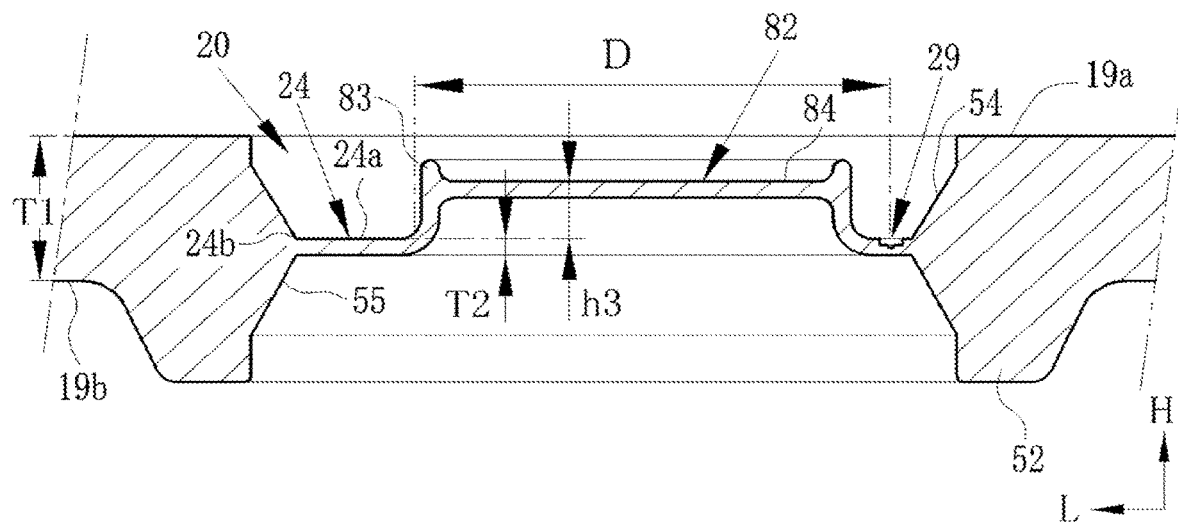
FIG. 12 is a cross-sectional view along the XII-XII line shown in FIG. 11.

The first valve portion 25 and the second valve portion shown in FIG. 3 are individually shaped into a domed-shape to bulge outwardly, and the valve portion 25 shown in FIG. 10 is also shaped into a domed-shape to bulge outwardly. Instead, as a valve portion 82 shown in FIGS. 11 and 12, the valve portion may also be formed to have a straight cross-section like a table. FIG. 11 shows a top plan view of the valve portion 82, and FIG. 12 shows a cross-section of the valve portion 82 along the XII-XII line shown in FIG. 11. The valve portion 82 is formed at a level higher than the thin plate portion 24, and a bending rigidity of the valve portion 82 is enhanced. Specifically, a flat portion 84 is formed at a height h3 from the thin plate portion 24, and a bead 83 is formed around a center 82a of the flat portion 84 to prevent deformation and warpage of the flat portion 84. In FIGS. 11 and 12, common reference numerals are allotted to the elements in common with those shown in FIGS. 3 and 10, and detailed explanations therefore will be omitted. As a modification of the valve portion 82, the bead 83 may be omitted, or at least one bead 83 may also be formed inside of the flat portion 84 concentrically with the flat portion 84. In addition, as the example shown in FIG. 3, the flat portion 84 may also be shaped into a domed-shape to bulge outwardly.

Further, two thin plate portions 24 in which the valve portion 25 shown in FIG. 10 or the valve portion 82 shown in FIG. 11 is formed respectively may be formed on different locations in the plate 19. In the case of thus arranging two thin plate portions 24, it is preferable to arrange the plate portions 24 in symmetrical locations. Furthermore, although the sealing plate 13 closes the upper opening of the container shown in FIG. 1, the sealing plate 13 may also be employed to close an opening formed on another face of the container 11.

REFERENCE SIGNS LIST

10: sealed battery; 11: container; 13: sealing plate; 19: plate; 20: surface depression; 22: explosion-proof valve; 24:

thin plate portion; 25: first valve portion; 26: second valve portion; 27: first outline; 28: second outline; 29: first groove; 30: second groove; 31: first rupturable portion; 32: second rupturable portion; 33: second folding line; 34: one end; 35: other end; 38: first folding line; 52: bead; 82: valve portion.

The invention claimed is:

1. A sealing plate, comprising:
an explosion-proof valve that is formed on a part of a plate serving as an outer shell of a container of a sealed battery, and that is opened by a pressure rise in the container, wherein
the explosion-proof valve comprises:
a thin plate portion that is formed in a part of the plate and that is thinner than the plate,
a valve portion that is formed by partially projecting the thin plate portion in a thickness direction to enhance a bending rigidity, and
a groove that is drawn as a boundary between the valve portion and the thin plate portion to serve as a score line,
the groove does not enclose the valve portion completely and both end portions of the groove are isolated away from each other,
the end portions are aligned with a straight line passing through the valve portion,
the sealing plate further comprises:
a folding line that extends outside the valve portion in a substantially parallel direction to the straight line on an opposite side of the straight line with respect to a center of the groove, and
a rupturable portion between the straight line passing through the end portions of the groove and the folding line that is ruptured after the groove is ruptured,
the valve portion is bent along the folding line to open the explosion-proof valve when the rupturable portion is ruptured after the groove is ruptured, and
a second length N is a distance between the straight line and the folding line, the second length N being greater than 1 mm.

2. The sealing plate as claimed in claim 1, wherein a thickness of the valve portion is identical to a thickness of the thin plate portion, and the valve portion has an arcuate cross-section to protrude toward outside of the container.

3. The sealing plate as claimed in claim 1, wherein the valve portion and the groove are formed symmetrically with each other with respect to the center of the groove in a transverse direction.

4. The sealing plate as claimed in claim 3, wherein the groove is a first groove and the sealing plate includes a second groove, the first groove and the second groove are formed symmetrically with each other and are overlapped with each other at the center.

5. The sealing plate as claimed in claim 1, wherein the thin plate portion is formed by depressing the plate.

6. The sealing plate as claimed in claim 5, wherein a ratio of the second length N to a first length D falls within a range from 18 to 42%, provided that the first length D is an opening range of the valve portion in a direction perpendicular to the straight line.

7. The sealing plate as claimed in claim 1, further comprising:
a bead formed on a top surface or a bottom surface of the plate to enclose the thin plate portion.

8. The sealing plate as claimed in claim 7, wherein the thin plate portion is formed at an intermediate level within a total thickness of a thickness of the plate and a thickness of the bead.

9. The sealing plate as claimed in claim 1, wherein
a center line extends through a center of the valve portion and is substantially parallel to the straight line,
the groove includes a first straight end portion extending from an upper intersection between the groove and the center line to one of the end portions, and
the groove includes a second straight end portion extending from a lower intersection between the groove and the center line to one of an other of the end portions.

* * * * *